| United States Patent [19] | [11] Patent Number: 4,650,596 |
|---|---|
| Schlueter et al. | [45] Date of Patent: Mar. 17, 1987 |

[54] POUR POINT DEPRESSANTS FOR PARAFFIN SOLUTIONS

[75] Inventors: Kaspar Schlueter, Hilden; Wolfgang Zoellner, Duesseldorf, both of Fed. Rep. of Germany

[73] Assignee: Henkel Kommanditgesellschaft auf Aktien, Duesseldorf, Fed. Rep. of Germany

[21] Appl. No.: 745,375

[22] Filed: Jun. 17, 1985

Related U.S. Application Data

[62] Division of Ser. No. 609,044, May 10, 1984, abandoned.

[30] Foreign Application Priority Data

May 13, 1983 [DE] Fed. Rep. of Germany ....... 3317396

[51] Int. Cl.$^4$ .......................................... C10M 133/16
[52] U.S. Cl. .............................. 252/51.5 R; 252/56 R
[58] Field of Search ................ 44/62, 66; 252/51.5 R, 252/56 R

[56] References Cited

U.S. PATENT DOCUMENTS

| 2,584,968 | 2/1952 | Catlin | 260/86.1 |
| 2,613,184 | 10/1952 | Catlin | 252/51.5 |
| 2,892,821 | 6/1959 | Stewart et al. | 260/80.5 |
| 4,151,333 | 4/1979 | Lenke et al. | 526/307.7 |

FOREIGN PATENT DOCUMENTS

1511503  5/1978  United Kingdom .

OTHER PUBLICATIONS

J. Brandrup, E. H. Immergut, Polymer Handbook, 2nd Edition, J. Wiley & Sons, New York, (1975), II, 105.
George E. Ham, Vinyl Polymerization, vol. 1, Part 1, M. Dekkar, New York, (1967), pp. 25, et seq.

*Primary Examiner*—Ferris H. Lander
*Attorney, Agent, or Firm*—Henry E. Millson, Jr.; Real J. Grandmaison; Mark A. Greenfield

[57] ABSTRACT

An ester/amide copolymer useful as a pour-point depressant, wherein: the ester comonomer is at least one acrylic acid or methacrylic acid—$C_{16-24}$ aliphatic alcohol ester; the amide comonomer is at least one acrylamide or methacrylamide, unsubstituted or substituted at the nitrogen atom; and the mol ratio of ester to amide is about 2–10:1.

24 Claims, No Drawings

POUR POINT DEPRESSANTS FOR PARAFFIN SOLUTIONS

This application is a division of application Ser. No. 609,044, filed May 10, 1984 and now abandoned.

BACKGROUND OF THE INVENTION

1. Field of the Invention

This invention relates to new auxiliaries for use in the production and processing of crude oil.

2. Statement of the Prior Art

In view of the high price of crude oil, petroleum containing a relatively high proportion of paraffin hydrocarbons, which hydrocarbons are solid at room temperature, is being produced and processed to an increasing extent. Oils such as these lose their fluidity on cooling from the generally high temperature of the oil reservoir to ambient temperature through the crystallization of relatively high melting constituents. In order, therefore, to avoid difficulties during production, transport and processing, it is standard practice to add pour point depressants, also known as flow promoters or crystallization inhibitors.

Several such pour point depressants are already known. Thus, U.S. Pat. Nos. 3,904,385 and 3,951,929, as well as corresponding German Application No. 22 64 328 describe the use of polymeric acrylates containing from 18 to 24 carbon atoms in the alcohol moiety. The disadvantage of these polymeric acrylates is that they have to be used in relatively high concentrations of from 0.01 to 3% by weight, based on the weight of the petroleum.

Copolymers of long-chain acrylic or methacrylic acid esters and 4-vinyl pyridine are described for the same utility in U.S. Pat. No. 3,957,659, as well as corresponding German Application No. 22 10 431 and in U.S. Pat. No. 4,110,283, as well as corresponding German Application No. 26 12 757. The copolymers in question are used in concentrations of from 200 to 2000 ppm. The disadvantage of these copolymers is that they are comparatively expensive because 4-vinyl pyridine is difficult to obtain on a commercial scale.

British Patent Specification No. 2,058,825, as well as corresponding German Application No. 29 26 474 describe copolymers of long-chain acrylic acid esters, namely esters of "Ziegler-process" alcohols, and dimethylaminoalkyl acrylic acid esters or methacrylic acid esters for use as pour point depressants. Particular emphasis is placed on the shear stability of the products and also their effectiveness in concentrations of from 50 to 350 ppm. However, it is known that esters of the type in question (containing dialkylamino groups) can undergo hydrolysis in the presence of water, resulting in the formation of amphoteric, largely insoluble and hence ineffectual polymers. Finally, British Patent Specification No. 2,082,604, as well as corresponding German Application No. 30 31 900 describe a copolymer of long-chain acrylates and maleic acid anhydride as a pour point depressant. The disadvantage of using this copolymer is that, because of their high reactivity, the anhydride groups are capable of further reacting to form acids which might possibly promote corrosion.

DESCRIPTION OF THE INVENTION

The present invention provides copolymers which are synthesized from monomers that are easy to obtain on a commercial scale and, hence, are inexpensive, comprise esters of acrylic or methacrylic acid with fatty alcohols obtainable from renewable raw materials, and which are highly effective in only low concentrations as pour point depressants for solutions in hydrocarbons of paraffins which are solid at room temperature. The copolymers according to the invention maintain the favorable properties of other known systems, for example shear stability.

Accordingly, the present invention relates to ester/amide copolymers of an ester component which is at least one acrylic acid ester and/or methacrylic acid ester containing from 16 to 24 carbon atoms and an amide component which is at least one acrylamide and/or methacrylamide which may be substituted or unsubstituted at the nitrogen atom, and the use of these copolymers as pour point depressants for solutions of solid paraffins in hydrocarbons.

The mol ratio of the ester component to the amide component should be about 2–10:1, preferably about 3–6:1, a mol ratio of about 4:1 being particularly preferred. It has been found that if the amount of the amide component is increased beyond a 2:1 mol ratio, the resulting copolymers are difficult to dissolve in mineral oils. It has also been found that if the amount of the amide component is decreased below a 10:1 mol ratio, the resulting copolymers are only effective as pour point depressants when used in very high concentrations.

The ester comonomer of the copolymers of this invention is the reaction product of acrylic acid or methacrylic acid with an aliphatic alcohol. It is particularly important that this alcohol has, on average, 16 to 24 carbon atoms, preferably 18 to 24 carbon atoms. The alcohol may be saturated or mono- or poly-unsaturated and may be substituted or unsubstituted. Mixtures of alcohols are a preferred embodiment and may be reacted with either or both the acrylic acid and methacrylic acid. Mixtures of alcohols derived from natural sources such as fats, oils or waxes are particularly preferred. Alcohol mixtures derived from the by-products of industrial processes are also useful, provided that they are of the proper chain length. Primarily straight-chain alcohols are particularly preferred, as are monobasic alcohols. Examples of preferred alcohol mixtures useful for producing the ester monomers of this invention are:

(a) straight-chain, even-numbered $C_{16-24}$ (preferably $C_{18-24}$) alcohols;

(b) saturated and unsaturated $C_{18-24}$ fatty alcohol cuts obtained by the reduction and/or hydrogenation of rapeseed oil fatty acid esters rich in erucic ($C_{22}$) acid;

(c) the hydrogenation products of erucic alcohol;

(d) a commercially available fatty alcohol mixture of stearyl ($C_{18}$) alcohol 5–15%, arachinyl ($C_{20}$) alcohol 10–20%, behenyl ($C_{22}$) alcohol >70% and lignoceric ($C_{24}$) alcohol approximately 1%, all by weight, is particularly preferred;

(e) stearyl alcohol 40–45%, arachinyl alcohol 8–20%, behenyl alcohol 40–45%, and lignoceryl ($C_{24}$) alcohol approximately 1%, all by weight; and (f) unsaturated $C_{18-22}$ alcohols having iodine numbers of about 60–95.

The amide comonomer of the copolymers of this invention is at least one acrylamide or methacrylamide which may be substituted or unsubstituted. The amide components may be expressed by the formula

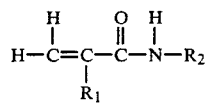

wherein $R_1$ is H or —$CH_3$, and
$R_2$ is H,
—$C_nH_{2n+1}$ where n is 1–18, preferably 1–10 and preferably linear,

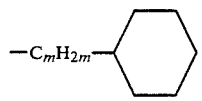

where m is 1–12, preferably 1–4, particularly 1, and preferably linear outside the ring,
—$C_yH_{2y}N(C_xH_{2x+1})_2$ where y is 1–10, preferably 3–6 and x is 1–4, preferably 1–2, most preferably where y is 3 and x is 1.

Specific amide components which are particularly preferred include acrylamide and methacrylamide per se, as well as N-(methyl)acrylamide, N-(butyl)acrylamide, N-(decyl)acrylamide, N-(octadecyl)acrylamide, N-(benzyl)acrylamide, dimethylaminopropyl acrylamide [especially N-(3-dimethylaminopropyl) methacrylamide], and the corresponding methacrylamides. Mixtures of these amides may also be used as the amide component.

Extremely short chain copolymers are primarily suitable for use in accordance with the invention.

Although it is not possible, at least using simple means, to predict molecular weight, specific viscosity does provide a comparative indication. The specific viscosity is the ratio between the respective times which a pure solvent (the standard) and a polymer solution take to flow through a capillary. The copolymers useful in accordance with the invention must have a specific viscosity of about from 0.05 to 0.5, preferably about 0.1 to 0.35, as measured on a 1% solution in toluene at 20° C.

In the production of the copolymers in accordance with this invention, the long-chain acrylic or methacrylic acid esters are produced in a first step. To that end, it is preferred to dissolve the fatty alcohols at elevated temperature, for example 60° C., in toluene or any other entraining agent forming an azeotrope with water and then to add the acid. 1 or 2% by weight of sulfuric acid and/or paratoluene sulfonic acid is then added as an esterification catalyst, followed by the addition of a radical polymerization initiator, for example hydroquinone, and then by boiling under reflux until the theoretical quantity of water has been removed. After the removal of unreacted acrylic and/or methacrylic acid by distillation, pasteform acrylic and/or methacrylic acid esters having ester numbers of from 130 to 160 are obtained. The esters are then dissolved in a suitable solvent, for example butanone and/or toluene, the amides are added and the polymerization reaction carried out after the addition of a radical former, for example an organic peroxide or an organic azo compound. Suitable products are obtained by polymerizing the monomers with from 0.5 to 3 mol percent of azoisobutyronitrile in a solvent, for example toluene, at 95° to 105° C. In this connection, it is possible to mix the monomers before the beginning of polymerization. However, it is preferred to add the comonomer which is consumed more quickly during the radical copolymerization reaction either continuously or in portions during the reaction. Products of which the molecular structure corresponds more to a theoretical ideal are obtained in this way. The monomer which is consumed more quickly during the copolymerization reaction may readily be determined by polymerizing the monomers in different molar ratios up to low conversion levels and ascertaining the incorporation ratio in the copolymers thus formed by nitrogen determination. For relevant specialized knowledge of polymer chemistry which may be used for that purpose, one may consult Polymer Handbook, 2nd Edition, J. Brandrup and E. H. Immergut, J. Wiley & Sons, New York (1975), II-105 and also G. E. Ham, Vinyl Polymerization, Vol. 1, Part 1, M. Dekker, New York (1967), pages 25, et seq.

Products according to this invention are suitable for lowering the pour point of solutions of paraffins, which are solid at room temperature, in hydrocarbons. In this connection, they have the advantage that they are not susceptible either to shear stressing or to hydrolysis in the event of prolonged storage in the presence of water. Accordingly, they are particularly suitable for addition to crude oils of high paraffin content for improving their pumpability at low temperatures and for preventing deposits in pipes and tanks. The quantity to be added amounts to between 20 and 400 ppm, depending on the paraffin content of the crude oil. In most cases, a reduction in pour point which is sufficient for practical purposes is obtained with additions of from 40 to 200 ppm.

EXAMPLES

1. Production of long-chain methacrylic and acrylic acid esters

The following starting fatty alcohols were used:
Fatty alcohol 1 (behenyl alcohol mixture)
  $C_{18}$: 5–15% by weight
  $C_{20}$: 10–20% by weight
  $C_{22}$: approx. 70% by weight
  $C_{24}$: approx. 1% by weight
Fatty alcohol 2 (hydrogenated erucic alcohol mixture)
  iodine number approx. 2
  $C_{18}$: 40–45% by weight
  $C_{20}$: 8–20% by weight
  $C_{22}$: 40–45% by weight
  $C_{24}$: approx. 1% by weight An approximately 70% by weight solution of the fatty alcohols in toluene was prepared at 60° C., followed by the addition of 1.5 moles of methacrylic or acrylic acid per mol of fatty alcohol. 2% by weight of paratoluene sulfonic acid, based on fatty alcohol, was then added, followed by the addition of 1% by weight of hydroquinone as polymerization inhibitor. The azeotropic esterification reaction took place over a period of 6 hours at 95° to 105° C. After the theoretical quantity of water by-product had been separated, the reaction mixture was shaken with aqueous hydrogen carbonate solution to remove the hydroquinone. After the addition of sodium sulfate as drying agent, the reaction mixture was filtered and the solvent removed by distillation under reduced pressure. The reaction products showed the following ester numbers:
Acrylic acid ester of alcohol 1 (A1)—152
Acrylic acid ester of alcohol 2 (A2)—158
Methacrylic acid ester of alcohol 1 (M1)—146
Methacrylic acid ester of alcohol 2 (M2)—152

2. Production of the copolymers

¼ mol of ester A1, A2, M1 or M2 and 1/16 mol of unsubstituted methacrylamide or dimethylaminopropyl methacrylamide (i.e., a mol ratio of 4:1, except for Copolymer 2) were dissolved in 80 g of toluene and the resulting solution introduced into a reaction vessel. After purging with nitrogen, the contents of the reaction vessel were heated to 100° C. To maintain the polymerization reaction, 0.005 mol of azoisobutyronitrile dissolved in 15 g of butanone was added dropwise in 8 portions at 15-minute intervals. The reaction mixture was then left to react for 2 hours at approximately 100° C. The resulting solution of the copolymer was readily pourable and could be used as such for lowering the pour point of crude oils. The specific viscosities of five copolymers produced in this manner are shown below in Table 1 and were measured in a 1% solution in toluene at 20° C.

3. Testing of the copolymers for their pour point depressant effect.

The indicated quantity of the particular copolymer was added to a test standard solution of 90% by weight of fuel oil EL and 10% by weight of paraffin having a pour point of 46°–48° C. 15 ml of this solution were poured into a closable test tube (diameter 1.3 cm, length 15.0 cm) which was then secured in a rotation machine. With the test tube rotating about its transverse axis (10 r.p.m.), the sample was cooled for 2 hours at −25° C. The sample was then allowed to thaw with the test tube still rotating and the temperature at which the entire contents of the test tube flow was determined. The temperature in question was measured at least twice. If properly done the measured temperatures should not differ by more than 2° C. The results obtained are shown in Table 1. The concentration in which the copolymers were used was 100 ppm and the pour point reductions obtained are by comparison with the untreated fuel oil/paraffin mixture of the test standard solution.

TABLE 1

| Copolymer No. | Ester monomer | Amide monomer | Mol ratio of ester to amide | ηsp | Reduction in pour point (°C.) |
| --- | --- | --- | --- | --- | --- |
| 1 | M2 | methacrylamide | 4:1 | 0.25 | 21.5 |
| 2 | M2 | methacrylamide | 6:1 | 0.25 | 14.5 |
| 3 | M2 | N—(3-dimethylamino-propyl)-methacrylamide | 4:1 | 0.35 | 17 |
| 4 | A2 | N—(3-dimethylamino-propyl)-methylacrylamide | 4:1 | 0.10 | 12 |
| 5 | A1 | N—(3-dimethylamino-propyl)-methacrylamide | 4:1 | 0.13 | 7 |

It is reasonable to extrapolate the following from the above results. Comparing Copolymers 1 and 2, which differ only as to mol ratio, indicates that a 4:1 ratio is perhaps more desirable than a ratio of 6:1, since the pour point is reduced further. However, a reduction as high as 21.5° C. (Copolymer 1) may be greater than needed, since a minimum pour point reduction of about 6° C. (preferably about 11° C.) may be sufficient for many applications. In Copolymers 3, 4, and 5, only the ester component was varied, other factors remaining constant. The specific viscosities and pour point reductions are all within the scope of this invention. There does not appear to be a direct correlation between specific gravity and pour point reduction. However, environmental conditions of use may require a higher or lower specific viscosity, independently of the pour point reduction efficacy.

4. Production and testing of further inventive copolymers

After the excellent results obtained above, a further group of copolymers was produced and tested in the same manner, with only the following exceptions. The test standard solution for measuring pour point reduction was a mixture of 85% by weight of gasoline (b.p. 145°–200° C.) and 15% by weight of paraffin (s.p. 46°–48° C.). In contrast to the general procedure, Copolymers 6, 7 and 8 were produced in methyl isobutyl ketone, and the solvent was distilled off on completion of polymerization and replaced by toluene. The reactants and results are shown below in Table 2.

TABLE 2

| Copolymer No. | Ester monomer | Amide monomer | Mol ratio of ester to amide | ηsp | Reduction in pour point (°C.) |
| --- | --- | --- | --- | --- | --- |
| 6 | M2 | acrylamide | 4:1 | 0.14 | 13 |
| 7 | M2 | acrylamide | 6:1 | 0.13 | 13 |
| 8 | M2 | acrylamide | 8:1 | 0.13 | 14 |
| 9 | M2 | N—(benzyl)methacrylamide | 3:1 | 0.16 | 11 |
| 10 | M2 | N—(benzyl)methacrylamide | 4:1 | 0.22 | 12 |
| 11 | M2 | N—(methyl)methacrylamide | 3:1 | 0.18 | 13 |
| 12 | M2 | N—(methyl)methacrylamide | 4:1 | 0.14 | 13 |
| 13 | M2 | N—(decyl)acrylamide | 3:1 | 0.18 | 14 |
| 14 | M2 | N—(decyl)acrylamide | 4:1 | 0.21 | 12 |

It is reasonable to extrapolate the following from the above results. In Copolymers 6, 7, and 8, the mol ratio was varied but all other factors remained constant. In spite of a variation of 4–8:1, it should be noted that the specific viscosity and pour point reduction values were hardly effected. In similar manner, Copolymer sets 9 and 10, 11 and 12, and 13 and 14, vary only as to mol ratio. These examples also demonstrate the wide variation of amide monomer components useful in this invention, specifically that they can be acrylamides or methacrylamides, and substituted or unsubstituted. All fourteen copolymers identified in Tables 1 and 2 are within the scope of this invention.

We claim:

1. A method of depressing the pour point of a hydrocarbon liquid which contains those paraffin hydrocarbons that are solid at ambient temperatures comprising adding to said hydrocarbon liquid a pour-point depressant effective amount of an ester-amide copolymer wherein the ester monomer of said copolymer is at least one acrylic acid or methacrylic acid aliphatic alcohol ester: said aliphatic alcohol being selected from the group consisting of;

(a) straight-chain, even-numbered $C_{18-24}$ alcohols;
   (b) saturated and unsaturated $C_{18-24}$ fatty alcohol cuts obtained by the reduction of rapeseed oil fatty acid esters rich in erucic ($C_{22}$) acid;
   (c) the hydrogenation products of erucic alcohol;
   (d) a mixture of strearyl ($C_{18}$) alcohol 5–15%, arachinyl ($C_{20}$) alcohol 10–20%, behenyl ($C_{22}$) alcohol >70% and lignoceric ($C_{24}$) alcohol approximately 1%, all percentages by weight;
   (e) a mixture of stearyl alcohol 40–45%, arachinyl alcohol 8–20%, behenyl alcohol 40–45%, and lignoceryl ($C_{24}$) alcohol approximately 1%, all percentages by weight; or
   (f) unsaturated $C_{18-22}$ alcohols having iodine numbers of about 60–95;

the amide monomer of said copolymer is at least one acrylamide or methacrylamide, unsubstituted or substituted at its nitrogen atom; and
   the mol ratio of ester monomer to amide monomer is about 2–10:1.

2. The method of claim 1 wherein said aliphatic alcohol is a mixture of alcohols derived from natural sources.

3. The method of claim 1 wherein said ester monomer is the reaction product of acrylic acid or methacrylic acid with
   a predominantly behenyl $C_{18-24}$ alcohol mixture, or
   a hydrogenated erucic alcohol mixture.

4. The method of claim 3 wherein said amide monomer is selected from the group consisting of
   N-(methyl)acrylamide, N-(butyl)acrylamide,
   N-(decyl)acrylamide, N-(octadecyl)acrylamide,
   N-(benzyl)acrylamide, N-(dimethylaminopropryl)acrylamide, the corresponding methacrylamides, or mixture thereof.

5. The method of claim 4 wherein the hydrocarbon liquid is a crude oil and said pour-point depressant is added to said hydrocarbon liquid in an amount of about 20–400 ppm.

6. The method of claim 4 wherein said copolymer has a specific viscosity of about 0.1 to 0.35, as measured on a 1% solution in toluene at 20° C.

7. The method of claim 1 wherein said amide monomer has the formula:

$$\begin{array}{c} H \quad\; O \;\; H \\ |\quad\;\; \| \;\;\; | \\ H-C=C-C-N-R_2 \\ | \\ R_1 \end{array}$$

wherein
   $R_1$ is H or —$CH_3$, and $R_2$ is H,
   —$C_nH_{2n+1}$ where n is 1–18,

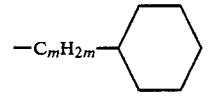

where m is 1–12, or
   —$C_yH_{2y}N(C_xH_{2x+1})_2$ where y is 1–10 and x is 1–4

8. The method of claim 7 wherein $R_2$ is H.

9. The method of claim 7 wherein $R_2$ is —$C_nH_{2n+1}$, linear and n is 1–10.

10. The method of claim 7 wherein the hydrocarbon liquid is a crude oil and said pour-point depressant is added to said hydrocarbon liquid in an amount of about 20–400 ppm.

11. The method of claim 7 wherein $R_2$ is

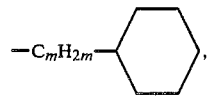

linear outside the ring, and m is 1–4.

12. The method of claim 11 wherein m is 1.

13. The method of claim 7 wherein $R_2$ is $C_yH_{2y}N(C_xH_{2x+1})_2$, Y is 3–6 and x is 1–2.

14. The method of claim 13 wherein y is 3 and x is 1.

15. The method of claim 1 wherein said amide monomer is selected from the group consisting of
   N-(methyl)acrylamide, N-(butyl)acrylamide,
   N-(decyl)acrylamide, N-(octadecyl)acrylamide,
   N-(benzyl)acrylamide, N-(dimethyaminopropryl)acrylamide, the corresponding methacrylamides, or mixtures thereof.

16. The method of claim 15 wherein the hydrocarbon liquid is a crude oil and said pour-point depressant is added to said hydrocarbon liquid in an amount of about 20–400 ppm.

17. The method of claim 1 wherein said mol ratio is about 3–6:1.

18. The method of claim 1 wherein said mol ratio is about 4:1.

19. The method of claim 1 wherein said copolymer has a specific viscosity of about 0.05 to 0.5, as measured on a 1% solution in toluene at 20° C.

20. The method of claim 1 wherein the hydrocarbon liquid is a mineral oil.

21. The method of claim 1 wherein the hydrocarbon liquid containing those paraffin hydrocarbons which are solid at ambient temperatures is a crude oil.

22. The method of claim 21 wherein said pour-point depressant is added to said crude oil in an amount of about 40–200 ppm.

23. The method of claim 1 wherein said pour-point depressant is added to said hydrocarbon liquid in an amount of about 20–400 ppm.

24. The method of claim 1 wherein the hydrocarbon liquid is a crude oil and said pour-point depressant is added to said hydrocarbon liquid in an amount of about 20–400 ppm.

* * * * *